(12) United States Patent
Lee et al.

(10) Patent No.: US 10,144,893 B2
(45) Date of Patent: Dec. 4, 2018

(54) LOW-FRICTION MEMBER IMITATING SHARK SKIN AND MANUFACTURING METHOD THEREFOR

(71) Applicant: Industry-University Cooperation Foundation Sunmoon University, Chungcheongnam-do (KR)

(72) Inventors: Soo Wohn Lee, Chungcheongnam-do (KR); Seung Ho Kim, Chungchongnam-do (KR); Tae Ho Kim, Chungcheongnam-do (KR); Sang Hoon Jeong, Chungcheongnam-do (KR); Jin Hyuk Choi, Chungcheongnam-do (KR)

(73) Assignee: Industry-University Cooperation Foundation Sunmoon University, Chungcheongnam-Do (KR)

( * ) Notice: Subject to any disclaimer, the term of this patent is extended or adjusted under 35 U.S.C. 154(b) by 0 days.

(21) Appl. No.: 15/543,164

(22) PCT Filed: Dec. 4, 2015

(86) PCT No.: PCT/KR2015/013262
§ 371 (c)(1),
(2) Date: Jul. 12, 2017

(87) PCT Pub. No.: WO2016/114497
PCT Pub. Date: Jul. 21, 2016

(65) Prior Publication Data
US 2018/0010059 A1     Jan. 11, 2018

(30) Foreign Application Priority Data
Jan. 16, 2015   (KR) ........................ 10-2015-0008064

(51) Int. Cl.
*C25D 3/12*    (2006.01)
*C25D 5/18*    (2006.01)
(Continued)

(52) U.S. Cl.
CPC ........ *C10M 103/04* (2013.01); *C10M 103/02* (2013.01); *C10M 125/02* (2013.01);
(Continued)

(58) Field of Classification Search
CPC . C25D 15/00; C25D 3/12; C25D 5/18; C25D 5/20; C10M 2201/041;
(Continued)

(56) References Cited

FOREIGN PATENT DOCUMENTS

| JP | H08210592 A | 8/1996 |
|---|---|---|
| JP | H09235583 A | 9/1997 |

(Continued)

*Primary Examiner* — Vishal V Vasisth
(74) *Attorney, Agent, or Firm* — Cesari & McKenna, LLP

(57) ABSTRACT

The present invention relates to a low-friction member imitating shark skin and a manufacturing method therefor, the low-friction member implementing a structure similar to shark skin and having riblets by stacking, in layers, composite particles formed by attaching spherical particles on the surfaces of plate-shaped particles, and thus the low-friction member has excellent low-friction characteristics. The present invention comprises: a base plate; plate-shaped particles stacked in layers on the surface of the base plate in the form of scales; and a plurality of spherical metal lubricating particles having a size smaller than that of the plate-shaped particles, and coated on the surfaces of the plate-shaped particles, wherein the metal lubricating particles are arranged in the form of a bridge connecting the base plate and the plate-shaped particles, and the plate-shaped particles to each other.

6 Claims, 31 Drawing Sheets

(51) Int. Cl.
  *C25D 5/20* (2006.01)
  *F01M 1/00* (2006.01)
  *C25D 13/22* (2006.01)
  *C25D 15/00* (2006.01)
  *F16N 15/00* (2006.01)
  *F16N 19/00* (2006.01)
  *C10M 103/02* (2006.01)
  *C10M 103/04* (2006.01)
  *C10M 125/02* (2006.01)
  *C10M 125/26* (2006.01)
  *C10M 125/28* (2006.01)

(52) U.S. Cl.
  CPC ........ *C10M 125/26* (2013.01); *C10M 125/28* (2013.01); *C25D 3/12* (2013.01); *C25D 5/18* (2013.01); *C25D 5/20* (2013.01); *C25D 13/22* (2013.01); *C25D 15/00* (2013.01); *F16N 15/00* (2013.01); *F16N 19/00* (2013.01); *C10M 2201/041* (2013.01); *C10M 2201/0413* (2013.01); *C10M 2201/053* (2013.01); *C10M 2201/10* (2013.01); *C10M 2201/12* (2013.01); *C10N 2220/082* (2013.01); *C10N 2230/06* (2013.01); *C10N 2240/10* (2013.01); *C10N 2250/08* (2013.01); *F01M 1/00* (2013.01)

(58) Field of Classification Search
  CPC ........ C10M 2201/053; C10M 2201/10; C10M 2201/12; C10N 2240/10; C10N 2250/08
  See application file for complete search history.

(56) References Cited

FOREIGN PATENT DOCUMENTS

| | | | |
|---|---|---|---|
| JP | 1094851 A1 | * | 4/1998 |
| JP | H1094851 A | | 4/1998 |
| KR | 20060069741 A | | 6/2006 |
| KR | 20110075096 A | * | 7/2011 |
| KR | 20110075096 A | | 7/2011 |
| KR | 20140088299 A | | 7/2014 |
| WO | WO2014104459 | * | 7/2014 |

* cited by examiner

LOW-FRICTION MEMBER IMITATING SHARK SKIN AND MANUFACTURING METHOD THEREFOR

CROSS REFERENCE TO RELATED APPLICATIONS

This application is the National Stage of International Application No. PCT/KR2015/013262, filed on Dec. 4, 2015, which claims the benefit of Korean Application No. 10-2015-0008064, filed on Jan. 16, 2015. The contents of both applications are hereby incorporated by reference in their entirety.

TECHNICAL FIELD

The present invention relates to a low-friction member, and particularly, to a low-friction member imitating shark skin and a manufacturing method therefor, the low-friction member implementing a structure similar to shark skin and having riblets by stacking, in layers, composite particles formed by attaching spherical particles on the surfaces of plate-shaped particles, and thus the low-friction member has excellent low-friction characteristics.

BACKGROUND ART

In general, in an automotive industry, frictional characteristics of many engine parts are crucial for cost reduction due to maintenance, parts replacement and breakage, reduction of investment cost by extending a life-span, and energy saving by reducing friction in addition to energy saving. In particular, the surface morphology in contact with each other wear has a significant impact on friction behaviors in the friction characteristics. In the case of sliding contact in a lubricated state, the frictional characteristics can be improved by the formation of surface irregularities such as a small dimple shape. These irregularities serve as a lubricant reservoir and serves to prevent a lubricant from leaking out. In addition, since abrasive particles can be removed from a contact surface and collected inside a structure, additional wear can be prevented, which is caused due to the abrasive particles.

Therefore, in recent years, studies have been conducted by various methods to enhance fuel efficiency and energy loss due to friction in power machine parts by reducing the energy loss due to friction resistance of engine parts and among these methods, in particular, a research into surface texturing has in active progress.

Surface texturing technology represents machining a large number of irregularities such as dimples or grooves on at least one surface of two surfaces in order to improve lubrication between two surfaces that are relatively moving through the lubricant. The irregularities of the surface store the lubricant and promote generation of hydrodynamic pressure by wear particle trapping.

In particular, laser surface texturing is mainly used to make patterns in the form of the dimples and as compared with other texturing methods, a process time is extremely fast and the shape and size of the dimples can be controlled by using laser parameters (pulse energy, pulse number) and in the case of research trends of the laser surface texturing, S. Schreck et al. in Germany has researched that performs texturing of channel and dimple types with respect to $Al_2O_3$ and $100Cr_6$ steels by using an Nd:YAG laser and reduce the friction according to their density under lubrication and Izhak Etsion of Israel has experimentally confirmed that a partial pattern is further improved than total patterning using the laser surface texturing in a cylinder ring, which is in direct contact with a cylinder in an internal combustion engine. In addition, Kovalchenko of the Argonne Institute in the United States has suggested that when there is the dimple based on a friction coefficient and the wear scar of the ball according to the dimple density using laser surface texturing (hereinafter, referred to as LST) and the viscosity of the lubricant, the wear rate of the ball was high, but a contact area increases as compared with an initial contact and the transition from boundary lubrication to a mixed lubrication region thus rapidly occurs in a lubricated state, thereby decreasing the friction coefficient.

However, even in the above-mentioned research, it is necessary to develop a new type of low-friction member which improves a low-friction effect due to an insufficient low-friction effect through the laser surface texturing technology.

In recent years, attempts have also been made to apply excellent structures which exist in natural living bodies in order to develop new functional materials. However, there has been an attempt to analyze the excellent functional structure existing in the natural living body in detail by various pioneering scholars. However, due to technical difficulties in terms of performing structural analysis and simplification work to be universally used and generalized from the structure shown in nature and in terms of manufacturing an actual product, a satisfactory result cannot be obtained and it is still at a standstill.

Technical Problem

Accordingly, the present invention is proposed to solve all problems in the related art and an object of the present invention is to provide a low-friction member imitating shark skin and a manufacturing method therefor, the low-friction member implementing a structure similar to shark skin and having riblets by stacking, in layers, composite particles formed by attaching spherical particles on the surfaces of plate-shaped particles, and thus the low-friction member has excellent low-friction characteristics.

Technical Solution

In order to achieve the object, a low-friction member according to the present invention includes: a substrate; and a lubricating layer constituted by plate-shaped particles which are stacked in layers on the surface of the substrate in the form of scales and multiple spherical metal lubricating particles having a smaller nano size than the plate-shaped particles and coated on the surfaces of the plate-shaped particles, and the metal lubricating particles are disposed in a form of multiple bridges connecting the substrate and the plate-shaped particles and connecting the plate-shaped particles.

Here, before the plate-shaped particles are stacked on the substrate, the metal lubricating particles are coated on the surfaces of the plate-shaped particles to form composite particles and thereafter, stacked on the surface of the substrate in a form of the composite particles.

Further, the plate-shaped particles may be graphene.

In addition, the plate-shaped particles may be made of any one material of polymer, ceramic, glass, and metallic fabric.

Moreover, the spherical lubricating particles may be made of any one material of gold, silver, and copper.

Further, the substrate may be constituted by a base plate and a Ni—SiC-material plating layer formed on the surface of the base plate by electroplating in order to reduce friction which occurs due to surface contact, and a low-friction dimple is formed on the plating layer with a depth not to exceed a thickness of the plating layer.

Meanwhile, a manufacturing method for a low-friction member according to the present invention includes: forming composite particles by coating spherical metal lubricating particles on surfaces of plate-shaped particles; stacking the composite particles in layer on the surface of a substrate in the form of scales; and strengthening bonding of the composite particles and the substrate with each other by pressing the composite particles and the substrate at a high temperature while the composite particles are stacked on the substrate.

Here, in the forming of the composite particles, ultrasonic waves are applied to slurries including plate-shaped particles and metal lubricating particles to coat the spherical metal lubricating particles on the surfaces of the plate-shaped particles by a collision of the plate-shaped particles and the spherical metal lubricating particles.

Further, in the forming of the composite particles, ultraviolet rays having a wavelength in a range of 200 to 400 nm are irradiated to the slurries including the plate-shaped particles and the metal lubricating particles to coat the spherical metal lubricating particles on the surfaces of the plate-shaped particles by a photoreduction reaction between the plate-shaped particles and the spherical metal lubricating particles.

Moreover, in order to manufacture the slurries including the plate-shaped particles and the metal lubricating particles, the plate-shaped particles are first introduced into a solvent and thereafter, stirred while applying ultrasonic waves to the plate-shaped particles to uniformly disperse the plate-shaped particles and thereafter, the spherical metal lubricating particles are additionally introduced into the solvent and thereafter, stirred while applying the ultrasonic waves to uniformly disperse the spherical metal lubricating particles.

In addition, the stacking of the composite particles on the surface of the substrate may include providing electrophoresis slurries by mixing the composite particles with a dispersion medium, immersing the substrate to be coated in the electrophoresis slurries, and introducing an electrode into the electrophoresis slurries and coating the composite particles on the surface of the substrate while moving the composite particles by electrophoresis by applying an electric field.

Advantageous Effects

In a low-friction member and a manufacturing method therefor according to the present invention, a structure similar to shark skin and having riblets is implemented by stacking, in layers, composite particles formed by attaching spherical particles on the surfaces of plate-shaped particles, and thus the low-friction member has excellent low-friction characteristics.

MODE FOR INVENTION

Figure 1:
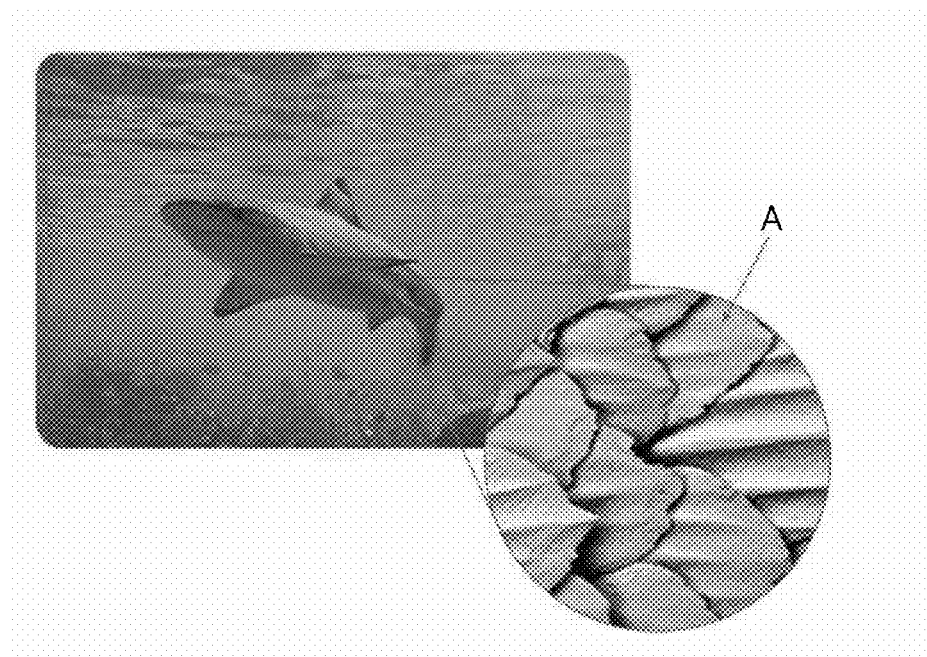
FIG. 1 is a reference diagram illustrating a structure of shark skin which becomes a motive of a low-friction member according to an embodiment of the present invention.

A low-friction member imitating shark skin and a manufacturing method therefor according to embodiments of the present invention will be described in detail with reference to the accompanying drawings. The present invention may have various modifications and various embodiments and specific embodiments will be illustrated in the drawings and described in detail in the specification. However, this does not limit the present invention to specific exemplary embodiments, and it should be understood that the present invention covers all the modifications, equivalents and replacements included within the idea and technical scope of the present invention. In describing each drawing, reference numerals refer to like elements. In the accompanying drawings, the sizes of structures are illustrated while being enlarged as compared with actual sizes for clarity of the present invention or downsized as compared with the actual sizes in order to appreciate a schematic configuration.

Further, terms including as first, second, and the like are used for describing various constituent elements, but the constituent elements are not limited by the terms. The terms are used only to discriminate one constituent element from another component. For example, a first component may be referred to as a second component, and similarly, the second component may be referred to as the first component without departing from the scope of the present invention. Meanwhile, if it is not contrarily defined, all terms used herein including technological or scientific terms have the same meanings as those generally understood by a person with ordinary skill in the art. Terms which are defined in a generally used dictionary should be interpreted to have the same meaning as the meaning in the context of the related art, and are not interpreted as an ideal meaning or excessively formal meanings unless clearly defined in the present application.

Figure 2:
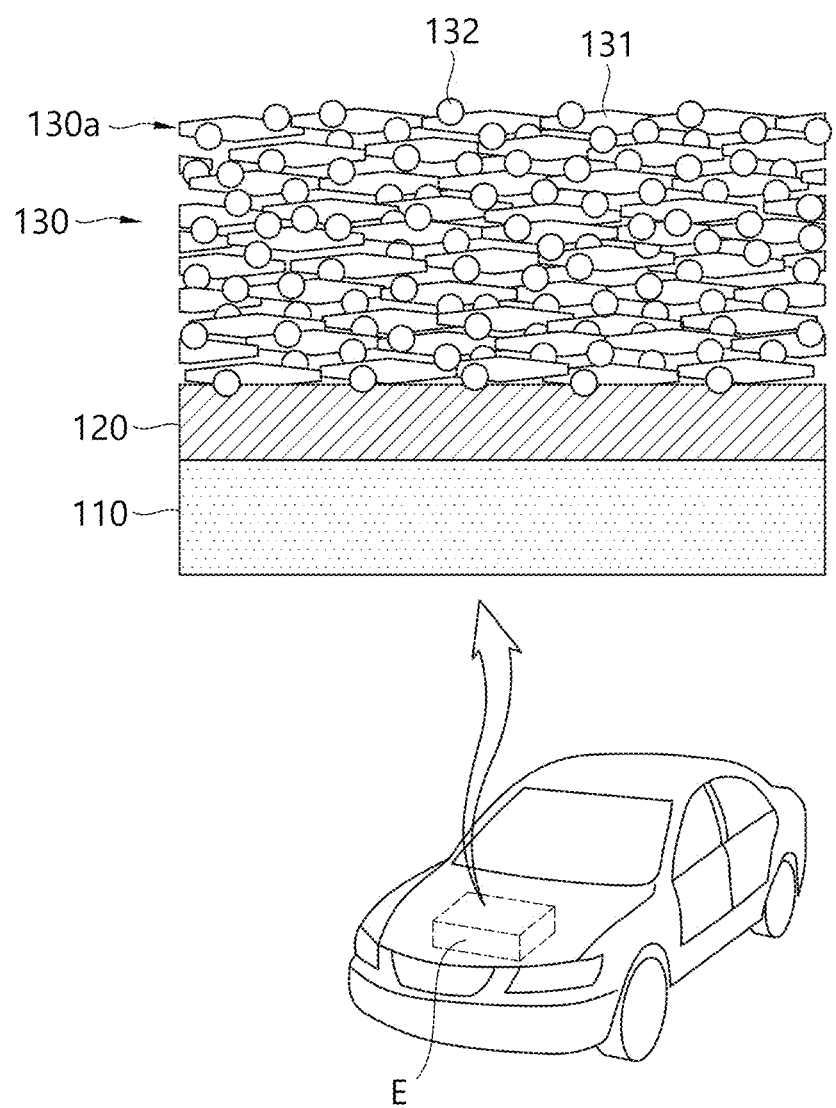
FIG. 2 is a configuration diagram for describing a configuration of the low-friction member according to the embodiment of the present invention.
Figure 3:
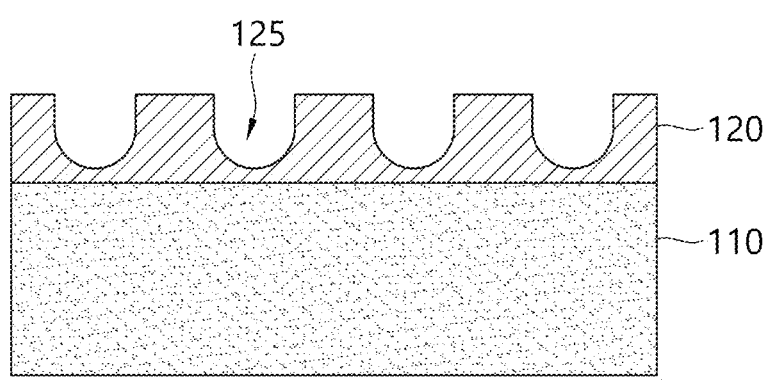
FIG. 3 is a cross-sectional view for describing a configuration of a substrate in the low-friction member according to the embodiment of the present invention.

FIG. 1 is a reference diagram illustrating a structure of shark skin which becomes a motive of a low-friction member according to an embodiment of the present invention and FIG. 2 is a configuration diagram for describing a configuration of the low-friction member according to the embodiment of the present invention.

As illustrated in FIGS. 1 and 2, the low-friction member according to the embodiment of the present invention is implemented in a realistic shape structure that may be industrialized while increasing low-friction performance by analyzing and simplifying a shape of the shark skin having a riblet. The low-friction member according to the embodiment of the present invention has a unique structure to form a lubricating layer 130 in which composite particles 130a composed of plate-shaped particles 131 and spherical metal lubricating particles 132 are stacked in layers in the form of scales and in particular, the low-friction member is applied to products exposed to extreme environments such as an automobile engine E which is subjected to pressure change and impact and friction contact, thereby exhibiting a high low-friction effect.

Hereinafter, the configuration of the low-friction member according to the embodiment of the present invention will be described.

As illustrated in FIG. 2, the low-friction member according to the embodiment of the present invention includes substrates 110 and 120 and the lubricating layer 130 in which the composite particles 130a composed of the plate-shaped particles 131 and the spherical metal lubricating particles 132 are stacked in layers on the surfaces of the substrates.

The substrates 110 and 120 may be made of various metallic materials including copper, nickel, aluminum, stainless steel, cast iron, and the like.

In addition, the substrates 110 and 120 may be constituted by a base plate 110 and a Ni—SiC-material plating layer 120 formed on the surface of the base plate 110 by electroplating in order to reduce friction caused by surface contact. Further, a plurality of dimples 125 are patterned on the surface of the plating layer 120. The dimple 125 is limitedly formed in an area where the plating layer 120 is formed. According to the configuration in which the substrate 110 and 120 have the Ni—SiC-material plating layer 120 and the plurality of dimples 125 are formed in the plating layer 120, the substrates 110 and 120 are enabled to autonomously continuously exhibit the low-friction effect even in a situation where the composite particles 130a composed of the plate-shaped particles 131 and spherical metal lubricant particles 131 are peeled from the surfaces of the substrates 110 and 120. An effect which may be expected when the dimples 125 are formed on the plating layer 120 will be described later in more detail.

The plate-shaped particles 131 are stacked in layers on the surfaces of the substrates 110 and 120 in the form of scales and the spherical metal lubricating particles 132 having a nano size are coated on the surfaces of the plate-shaped particles 131. It should be noted in relation with manufacturing that a process of coating the surfaces of the plate-shaped particles 131 with the metal lubricating particles 132 before the plate-shaped particles 131 are stacked on the substrates 110 and 120 is first carried out. The reason is that only when the spherical metal lubricating particles 132 are stacked while being coated on the surfaces of the plate-shaped particles 131, the spherical metal lubricating particles 132 are enabled to be evenly disposed among the plate-shaped particles 131. (This is preferably minutely managed through various other separate processes during manufacturing). The spherical metal lubricating particles 132 arranged as such are disposed between the substrates 110 and 120 and the plate-shaped particles 131 and between the plate-shaped particles 131 in a bridge form and serve as a lubricant having a bearing characteristic, while the spherical metal lubricating particles 132 grants a lubricating characteristic to the plate-shaped particles 131 to flow with each other to allow the entirety of the lubricating layer 130 to exhibit the low-friction effect.

Here, the plate-shaped particles 131 are mainly made of graphene, but may be provided as graphene-like particles such as $MoS_2$, $WS_2$, and h-BN. Further, a range of the material may be broadened to polymer, glass, metal, fabric, and the like.

Meanwhile, the spherical metal lubricating particles 132 may be made of any one material of gold, silver, and copper and during manufacturing, gold is obtained from gold precursors including $HAuCl_4$, $HAuCl_4$, $3H_2O$, etc., silver is obtained from silver precursors including $AgNO_3$, silver acetate, $Ag(NH_3)_2^+$, etc., and copper is obtained from copper precursors including $CuSO_4$, $CuCl_2$, $Cu(AOT)_2$, $Cu(NO_3)_2$, $Cu(acac)_2$, etc.

Figure 4:
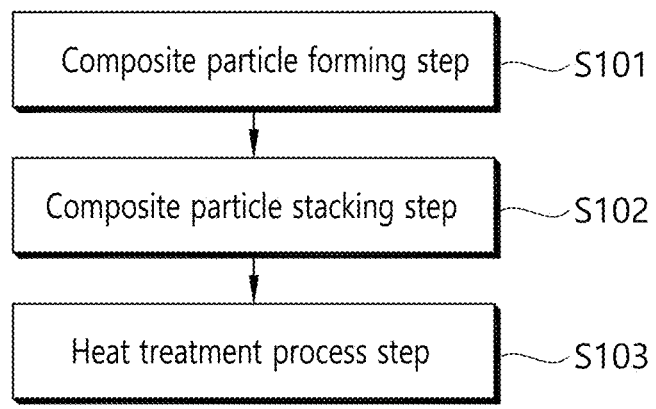
FIG. 4 is a flowchart for describing a manufacturing method for a low-friction member according to an embodiment of the present invention.

A manufacturing method for the low-friction member according to the present invention, which is configured as such will be described below in detail with reference to the accompanying drawings. FIG. 4 is a flowchart for describing a manufacturing method for a low-friction member according to an embodiment of the present invention and FIGS. 5a to 8 are a series of reference diagrams for describing the manufacturing method for the low-friction member according to the embodiment of the present invention.

The manufacturing method for the low-friction member according to the embodiment of the present invention is generally constituted by a composite particle forming step (S101), a composite particle stacking step (S102), and a heat treatment process step (S103) as illustrated in FIG. 4.

Figure 5A:
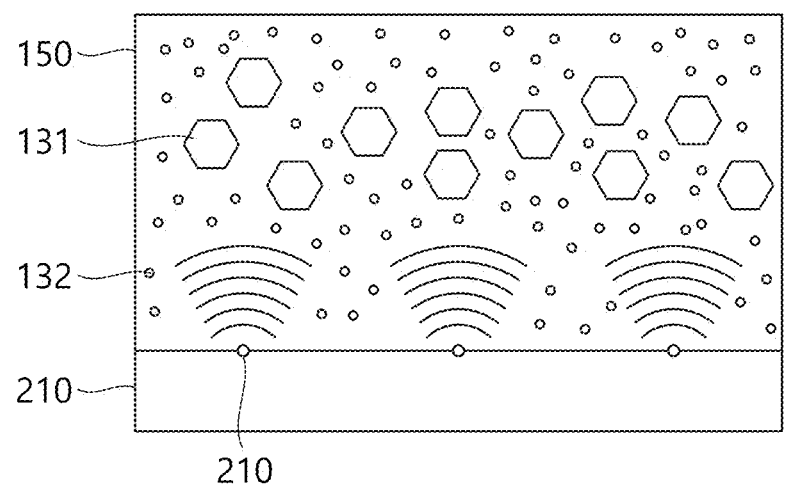
FIG. 5a is a configuration diagram of an ultrasonic wave generating apparatus in the manufacturing method for a low-friction member according to the embodiment of the present invention.
Figure 5B:
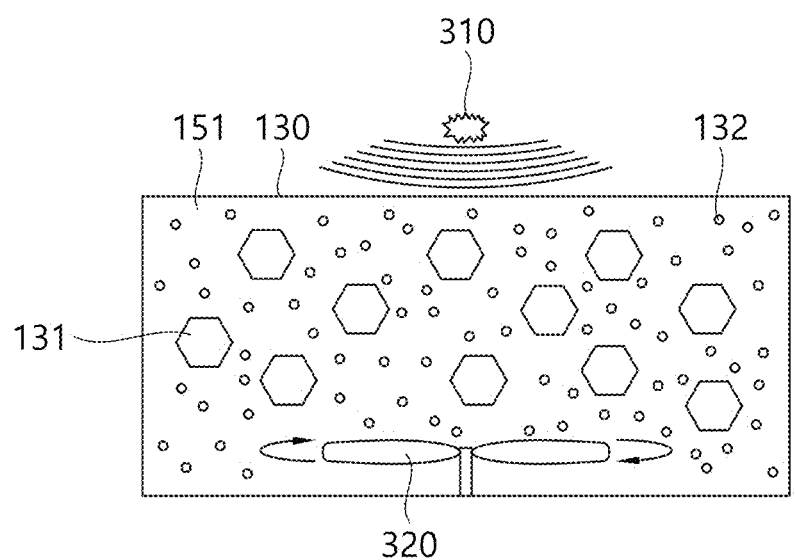
FIG. 5b is a configuration diagram of an ultraviolet ray generating apparatus in the manufacturing method for a low-friction member according to the embodiment of the present invention.

First, in the composite particle forming step (S101), the spherical metal lubricating particles 132 are coated on the surfaces of the plate-shaped particles to form the composite particles 130a in which the spherical metal lubricating particles 132 are coated on the plate-shaped particles 131. To this end, the manufacturing method may be performed by a method using ultrasonic waves as illustrated in FIG. 5a and a method using ultraviolet-ray irradiation as illustrated in FIG. 5b. In the method using the ultrasonic waves between both methods, slurries 150 including the plate-shaped particles 131 and the precursor type metal lubricating particles 132 are contained in an ultrasonic wave generating apparatus 200 in which an oscillator 210 is installed and thereafter, the ultrasonic waves generated by the oscillator 210 are applied. Then, the spherical metal lubricating particles 132 repeatedly collide with the plate-shaped particles 131 with strong force while micro-jet made by a collision of acoustic bubbles moves at a high speed (100 m per second or more) and multiple metal lubricating particles 132 are deposited onto the surfaces of the plate-shaped particles 131 during such a process, and as a result, surface coating is achieved. The ultrasonic waves applied in this case has power of 800 to 1200 W, and a frequency of 20 kHz as data for 0.5 to 12 hours. Since the coating method using the ultrasonic waves has less restrictions of shapes and sizes of particles than a general coating method which is used in the related art, it is effective to handle the metal lubricating particles 132 having the nano size.

Figure 6:
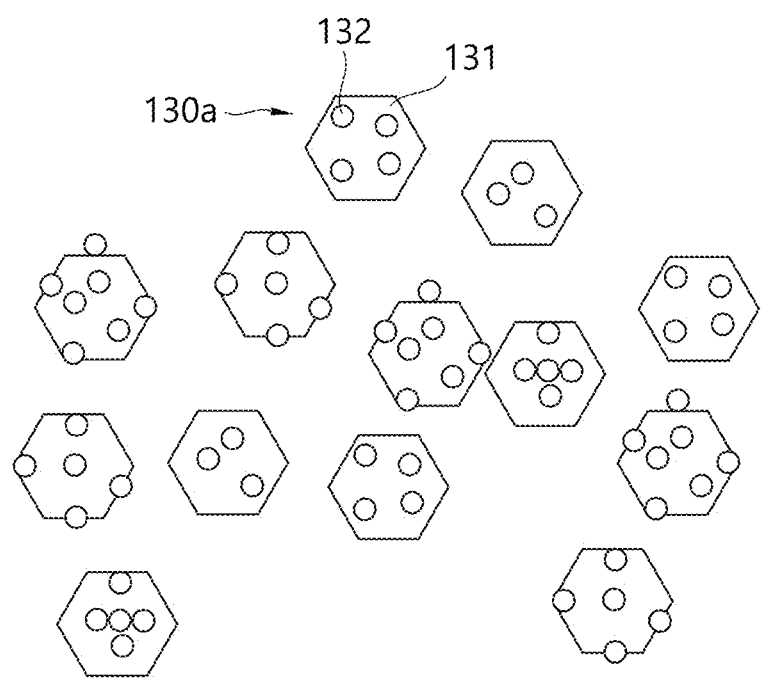
FIG. 6 is a reference diagram for describing a method for forming composite particles in the manufacturing method for a low-friction member according to the embodiment of the present invention.

Further, in the method for forming the composite particles 130a by using the ultraviolet-ray irradiation, the slurries 150 including the plate-shaped particles 131 and the precursor type metal lubricating particles 131 having the nano size are contained in an ultraviolet ray generating apparatus 300 in which a UV lamp 310 and a stirring wing 320 are installed and thereafter, ultraviolet rays are irradiated to the slurries 150 as illustrated in FIG. 5b. In this case, the UV lamp 310 having a wavelength range of 200 to 400 nm is used in order to irradiate the ultraviolet rays and a distance between the UV lamp 310 and the slurries 150 is fixed to approximately 10 cm. Then, the spherical metal lubricating particles 132 are deposited on the surfaces of the plate-shaped particles 131 through a photoreduction process to achieve the surface coating. During such a process, a more rapidly result may be obtained while the stirring wing installed in the ultraviolet ray generating apparatus 300 rotates. As a result, as illustrated in FIG. 6, the composite particles 130a of a type may be obtained, in which the multiple spherical metal lubricating particles 132 are coated on the surfaces of the plate-shaped particles 131. In this case, the frequency of the spherical metal lubricating particles 132 with respect to the surfaces of the plate-shaped particles 131 are suitably at a level of 5 to 50 vol %.

Here, in order to prepare the slurries 150 containing the plate-shaped particles 131 and the metal lubricating particles 132, the plate-shaped particles 131 are first introduced into a solvent and stirred while applying the ultrasonic waves to disperse the plate-shaped particles 131 uniformly. Thereafter, the spherical metal lubricating particles 132 are further added to the solvent and then, further stirred while applying the ultrasonic waves to uniformly disperse the spherical metal lubricating particles 132.

Figure 7:
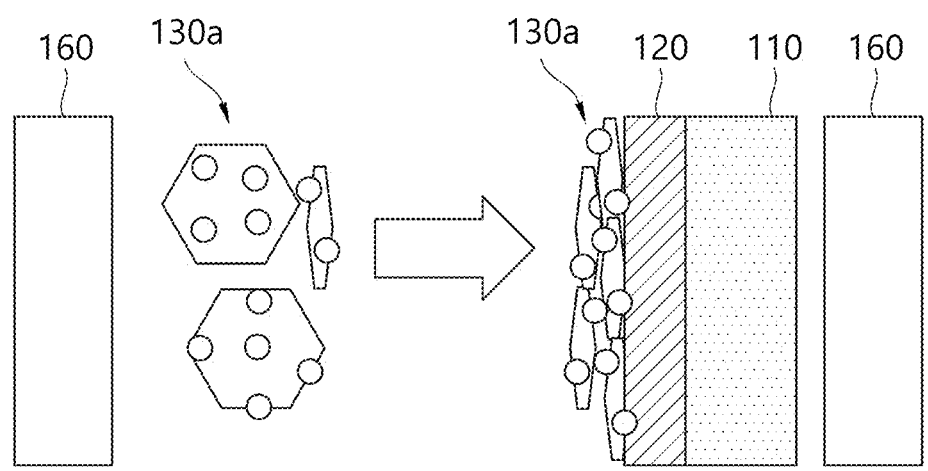
FIG. 7 is a conceptual configuration diagram for describing a composite particle stacking step by an electroplating method in the manufacturing method for a low-friction member according to the embodiment of the present invention.

Thereafter, the composite particle stacking step (S102) is performed. The composite particle stacking step (S102) is achieved by using electrophoresis as illustrated in FIG. 7. To this end, a step of providing an electrophoresis slurry by mixing the composite particles 130a with a dispersion medium; a step of immersing the substrates 110 and 120 to be coated in the electrophoresis slurry; and a step of coating the surfaces of the substrates 110 and 120 with the composite particles 130a while moving the composite particles 130a by the electrophoresis while applying an electrode 160 to the electrophoresis slurry are performed in order. In this case, direct current (DC) voltage of 5 to 50 V is applied for 0.5 to 30 minutes and a current density is set as 50 to 200 mA/cm.

Figure 8:
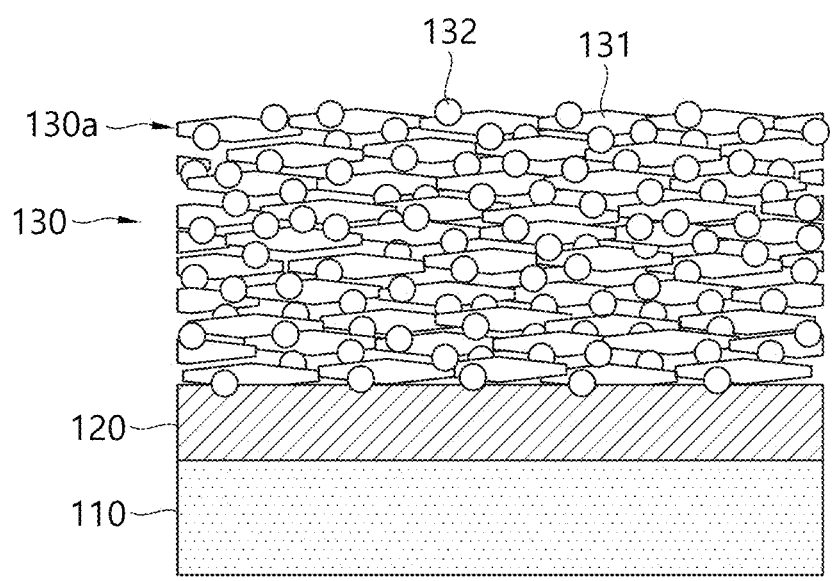
FIG. 8 is a configuration diagram of the low-friction member completed in the manufacturing method for a low-friction member according to the embodiment of the present invention.

As a result, as illustrated in FIG. 8, a product having the lubricating layer 130 in which the composite particles 130a are stacked in layers on the surfaces of the substrates 110 and 120 in the form of scales is obtained.

Thereafter, the heat treatment process step (S103) is performed. In this step, while the composite particles 130a are stacked on the substrates 110 and 120, the composite particles 130a and the substrates 110 and 120 are pressed at a high temperature to strengthen bonding force therebetween.

Continuously, the substrates 110 and 120 are not made only of the base plate 110 and the plating layer 120 is formed on the surfaces of the substrates 110 and 120, which influence the formed plating layer 120 exerts on enhancement of the low-friction effect will be described in detail.

FIGS. 9a to 9d are a series of reference diagrams for describing a method for manufacturing a substrate in a low-friction member according to an embodiment of the present invention.

As illustrated in FIGS. 9a to 9d, the substrates 110 and 120 are preferably constituted by the base plate 110, the plating layer formed on the surface of the base plate 110 by electroplating, and multiple dimples 125 further strengthening a low-friction characteristic while forming a pattern on the plating layer 120.

Figure 9A:
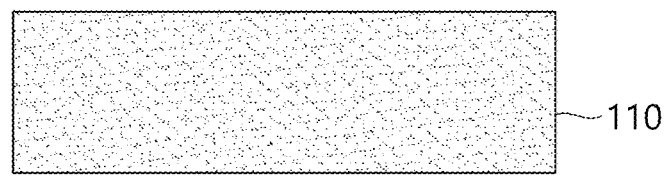
FIGS. 9a to 9d are a series of reference diagrams for describing a method for manufacturing a substrate in a low-friction member according to an embodiment of the present invention.
Figure 9B:
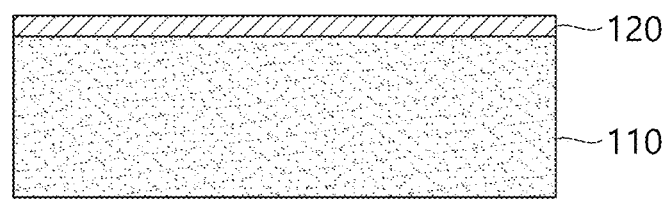
Figure 9C:
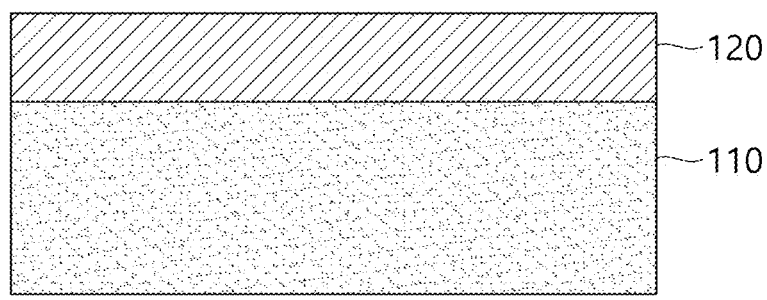
Figure 9D:
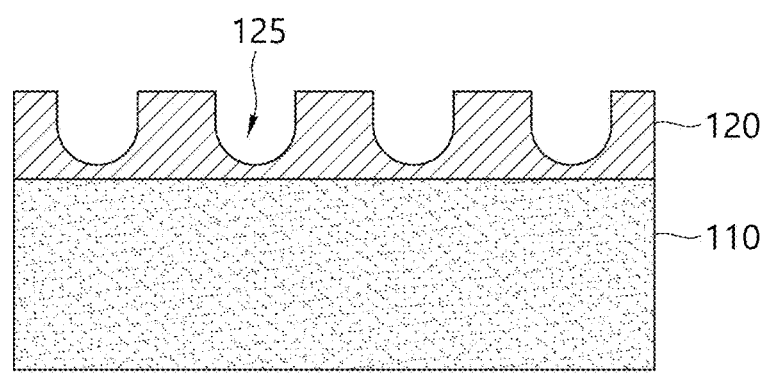

Here, a forming order of the plating layer 120 and the dimple 125 is very important and only after first, the plating layer 120 is gradually formed on the surface of the base plate 110 illustrated in FIG. 9a by the electroplating as illustrated in FIGS. 9b and 9c, the dimple 125 is formed by laser irradiation at least as illustrated in FIG. 9d. Only in this case, the low-friction effect of the plating layer 120 and the low-friction effect by the patterned multiple dimples 125 may be obtained in combination.

When the dimple 125 is first formed on the surface of the base plate 110 contrary thereto and the plating layer 120 is intended to be formed by the electroplating, an electrolyte solution is difficult to penetrate into the dimple 125 having a minute size, which is formed earlier, and as a result, it is difficult to uniformly plate the entirety of the surface of the base plate 110. Further, when the dimples 125 are observed while the plating is completed, it may be considered that it may be almost impossible that the dimples 125 remain in a uniform shape with respect to each other while maintaining a diameter and a depth which are originally intended. Therefore, the low-friction effect of the plating layer 120 by the electroplating and the low-friction effect by the pattern of the dimples 125 may not be obtained in combination. Such a fact becomes an important cause why such a fact may not be considered as the same technique as the low-friction member presented in the embodiment of the present invention because a groove similar to the dimple is formed on the surface of a specified member which is electroplated by chance.

Further, a thickness of the plating layer 120 is formed to be 1.0 mm or less and it may be most preferable to adopt a composite material of Ni—SiC as the material of the plating layer 120 in terms of the low-friction effect. Therefore, according to an experimental result, a case where the plating layer 120 made of Ni is formed on the surface of the base plate 110 by the electroplating exhibits a more excellent characteristic than a member originally made of Ni and a case where the plating layer 120 is made of the composite material of Ni—SiC instead of Ni exhibits the most excellent low-friction characteristic.

Meanwhile, in the case of the dimple 125, various methods may be adopted, but the dimple 125 is preferably formed by the laser irradiation due to precision or convenience of the laser irradiation and the depth of the dimple 125 may be formed in the range of 0.5 to 1.5 times of a diameter of the dimple 125 and it is important that the depth is restricted to the area where the plating layer 120 is formed by preventing the depth of the dimple 125 from exceeding the thickness of the plating layer 120.

Here, the diameter of the dimple 125 may be formed to belong to a range of 10 to 40 μm and it is preferable that an interval between adjacent dimples 125 is formed to belong to a range of 120 to 180 μm for enhancement of the low-friction characteristic.

Hereinafter, experimental examples of various viewpoints for manufacturing the low-friction member and verifying a friction reduction effect according to the embodiment of the present invention will be described.

Low-Friction Effect of Plating Layer Formed by Electroplating

A composition of an electrolytic bath for forming a plating layer on the surface of a base plate by electroplating is illustrated in Table below. A base plate (steel plate and copper plate) having a size of 1.5×1.5 cm was positioned on a cathode, Ni balls were contained in a Ti-basket and spaced apart from each other at a distance of about 3 cm on an anode, and electroplating was performed while the cathode and the anode were contained in an electrolyte made by using Ni-Sulfamate having a purity of 90% or more. In this case, cetyltrimethyl ammonium bromide (CTAB) and sodium dodecyl sulphate (SDS) were used as a surfactant and a corrosion inhibitor, respectively.

TABLE 1

| Compositions | Parameters |
| --- | --- |
| $Ni(NH_2SO_3)_2$ $(gl^{-1})$ | 300 |
| $NiCl_2$ $(gl^{-1})$ | 10 |
| $H_3BO_3$ $(gl^{-1})$ | 40 |
| β-SiC $(gl^{-1})$ | 20 |
| SiC size (nm) | 270 |
| CTAB $(gl^{-1})$ | 0.1 |
| Sod. dodecyl sulfate $(gl^{-1})$ | 0.2 |

In addition, in operating parameters, a temperature (° C.) was 50, pH was 4, a current type was Pulse, a stirring rotation speed (rpm) was 250, an ultrasonic frequency (kHz) was 23 to 78, and an ultrasonic power (W) was 100 to 300. However, the applied current type and the ultrasonic wave were selectively applied to compare the results. The experiment results may be summarized as follows based on the accompanying drawings.

Figure 10:
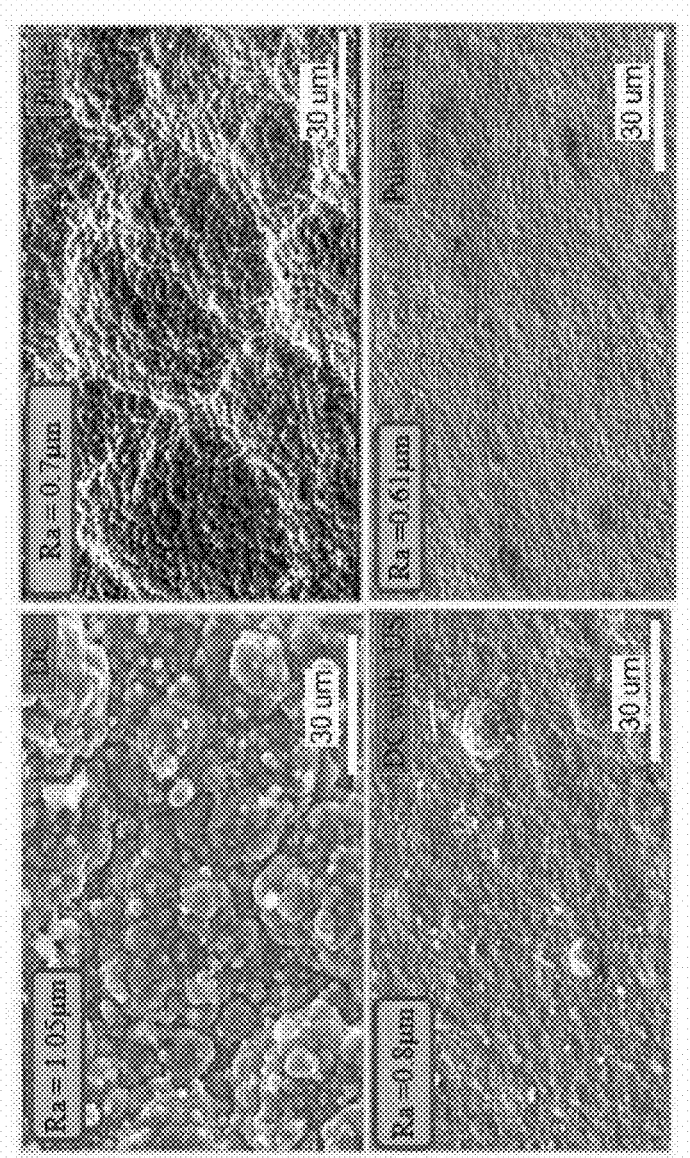
FIG. 10 is a photo illustrating a surface type of a Ni—SiC plating layer according to a current type used in electroplating and whether ultrasonic wave is applied.

Referring to FIG. 10, a surface type of a Ni—SiC plating layer is illustrated according to a current type used in electroplating and whether ultrasonic waves are applied. As results of comparative experiments of a case where the ultrasonic waves are not applied while performing electroplating using a direct current, a case where the ultrasonic waves are not applied while performing electroplating using a pulse current, a case where the ultrasonic waves are applied while performing electroplating using a direct current, and a case where the ultrasonic waves are applied while performing electroplating using a pulse current, as illustrated in FIG. 10, it can be confirmed that the surface of the plating layer is almost homogenized so that the surface roughness Ra reaches 0.61 μm when the ultrasonic waves are applied while performing electroplating using a pulse current. Such a result is shown because growth of crystal particles causing the roughness and formation of new nucleation sites are efficiently suppressed by a synergy effect between the pulse current and the ultrasonic wave in addition to an ultrasonic cavitation effect.

Figure 11:
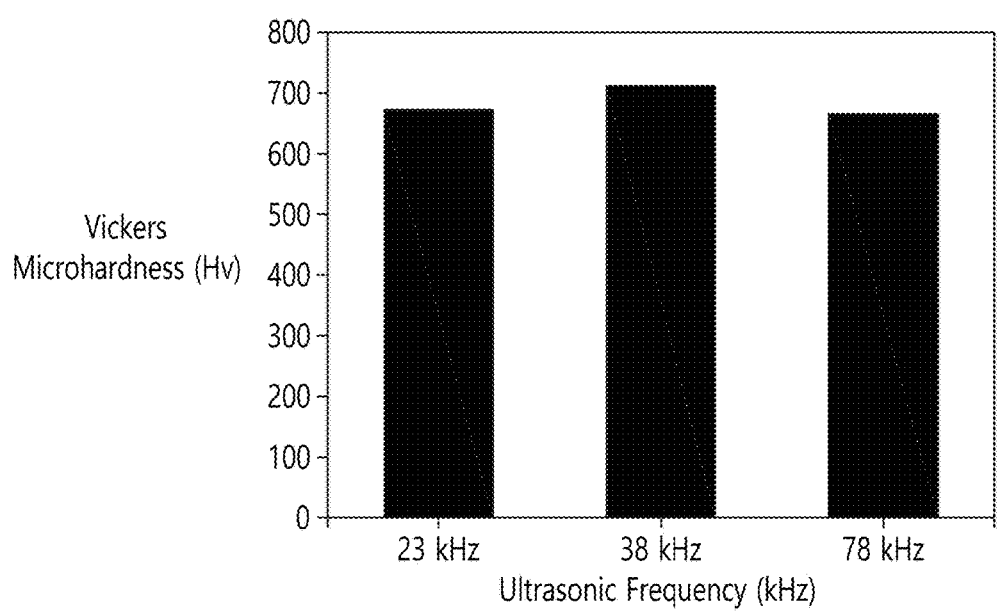
FIG. 11 is a graph of comparing Vickers microhardness for each frequency of an ultrasonic wave applied during electroplating.
Figure 12:
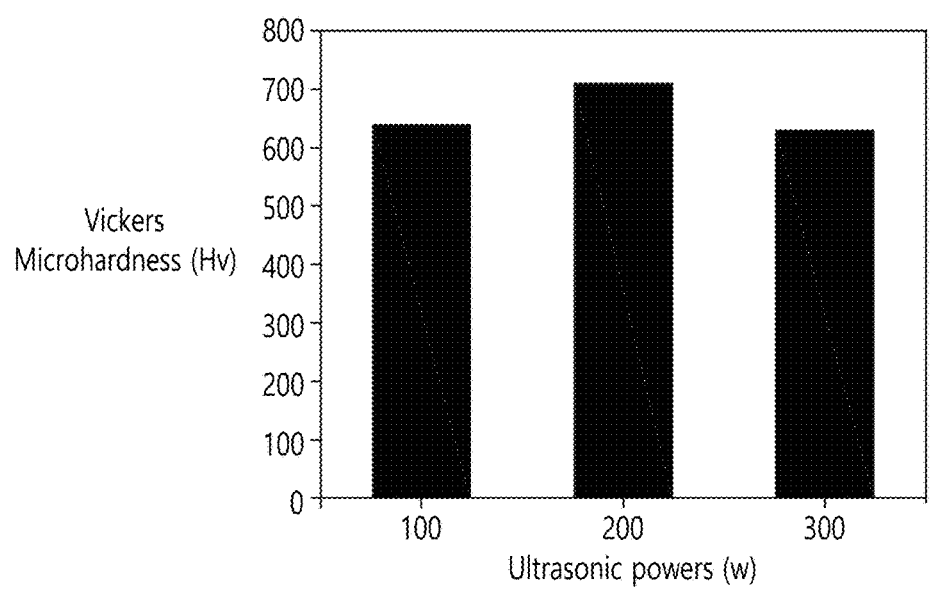
FIG. 12 is a graph comparing Vickers microhardness for each power of the ultrasonic wave applied during electroplating.
Figure 13:
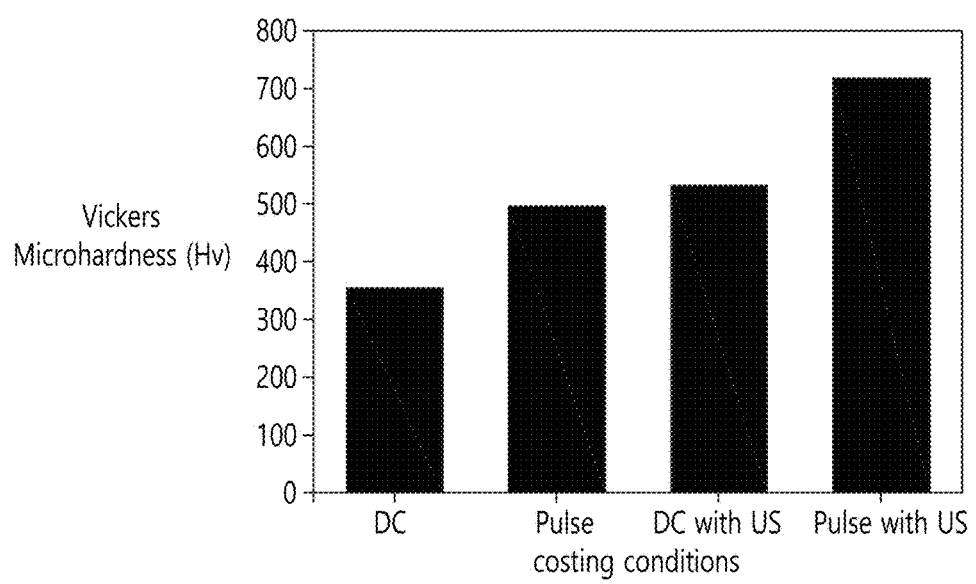
FIG. 13 is a graph illustrating the comparison of Vickers microhardness for each frequency depending on a current type and whether to apply the ultrasonic wave during electroplating.

When describing optimized parameters of the ultrasonic wave applied during electroplating with reference to FIGS. 11 and 12, it was shown that when the frequency of the applied ultrasonic waves are 38 kHz and the power was 200 W, Vickers microhardness of the Ni—SiC plating layer was highest. In this case, as illustrated in FIG. 13, it was shown that when the ultrasonic waves are applied while the electroplating was performed by using the pulse current other than the direct current, the Vickers microhardness was highest.

Figure 14:
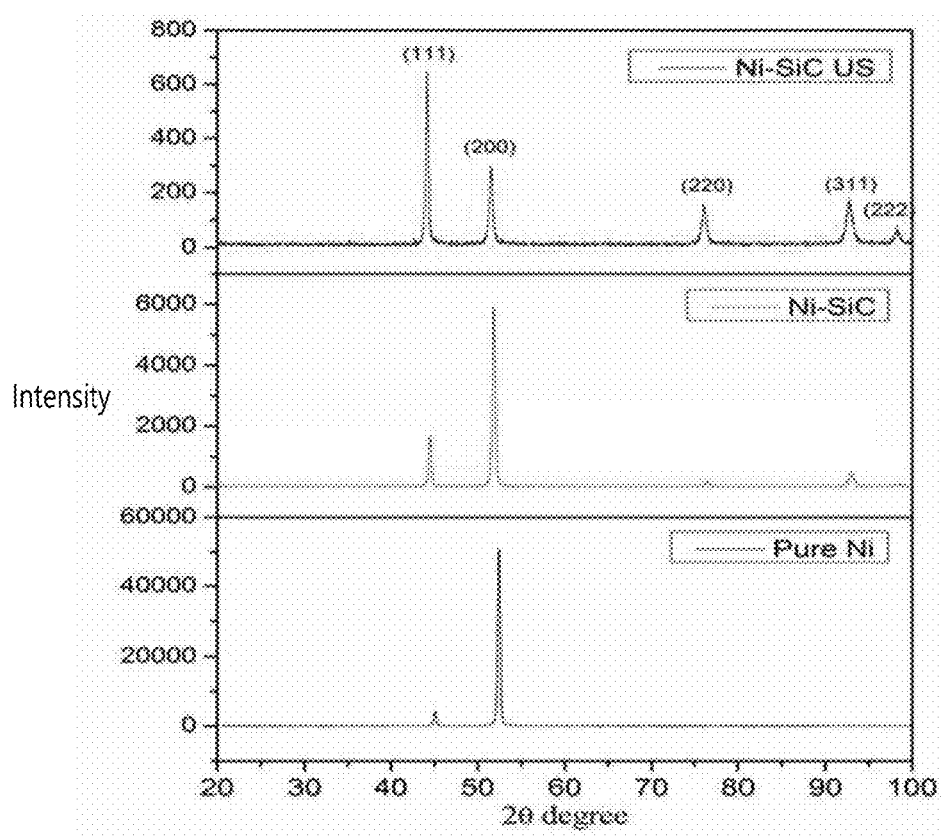
FIG. 14 is an X-ray diffraction analysis graph for describing peak intensity depending on a used material and whether to apply the ultrasonic wave during electroplating.

FIG. 14 is a graph illustrating a result of comparing internal fine structures through X-ray diffraction analysis by targeting a pure Ni member, an Ni—SiC plating layer electroplated by using only a pulse current (100 Hz, 50% duty cycle) while the ultrasonic waves are not applied, and a Ni—SiC plating layer electroplated by using a pulse current while the ultrasonic waves are applied together. As a result, it was shown that the intensity of 200 peak was further decreased by reinforcement of 200 and 311 peaks when the ultrasonic waves are applied together than when the electroplating was performed by using only the pulse current. Such a result shows that the formation of the Ni—SiC plated layer by electroplating while applying ultrasonic waves is more structurally improved than the case of not applying the ultrasonic waves.

Figure 15:
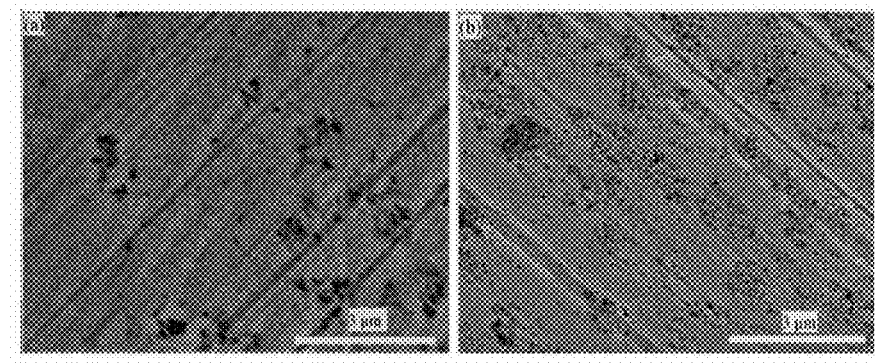
FIG. 15 is a photo of a cross-sectional shape of a plating layer depending on the current type and whether to apply the ultrasonic wave during electroplating.

FIG. 15 illustrates a comparison of a cross-sectional shape a of the Ni—SiC plating layer electroplated by using only the pulse current without applying the ultrasonic waves and a cross-sectional shape b of the Ni—SiC plating layer electroplated by using the pulse current while the ultrasonic waves are applied together. As a result, it can be seen that in the Ni—SiC plating layer electroplated by using the pulse current while the ultrasonic waves are applied, SiC nano particles are more uniformly dispersed in a Ni matrix. Such a result means that the ultrasonic waves that cause high pressure fluctuation and violent vibration effectively act in penetration of the SiC nano particles into the Ni matrix.

Figure 16:
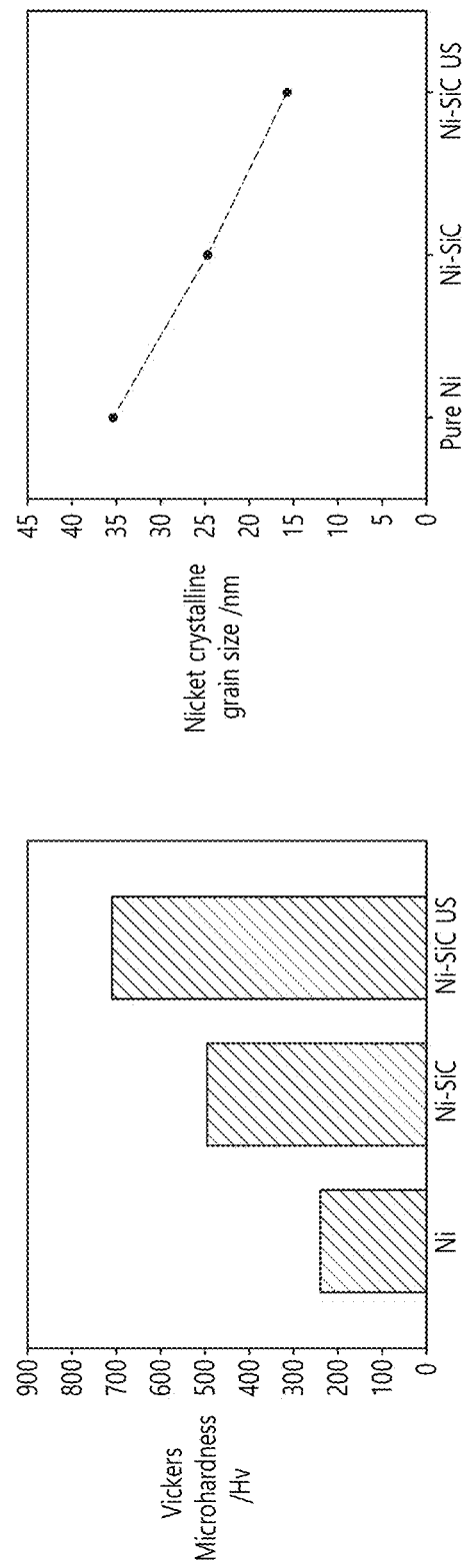
FIG. 16 is a graph of comparing and analyzing the Vickers microhardness and a crystal particle size of Ni depending on the current type and whether to apply the ultrasonic wave during electroplating.

FIG. 16 is a graph of comparing and analyzing Vickers microhardness and a crystal particle size of Ni by targeting a pure Ni member, an Ni—SiC plating layer electroplated by using only a pulse current while the ultrasonic waves are not applied and a Ni—SiC plating layer electroplated by using the pulse current while the ultrasonic waves are applied together. As a result, it can be seen that the Vickers microhardness of the Ni—SiC plating layer electroplated by using only the pulse current is higher than that of the pure Ni member and the Vickers microhardness of the Ni—SiC plating layer electroplated while the ultrasonic waves are applied together is higher than that of the Ni—SiC plating layer electroplated by using only the pulse current (see a left graph). As such, it is shown that the result of describing the Vickers microhardness for each comparison object is related with dispersion strengthening and atomization effects. Furthermore, it is determined that as the number of nucleation sites increases due to the ultrasonic effect and the fusion of the nano particles, the growth of the crystal particles is disturbed, and as a result, the crystal particle size becomes smaller and the hardness of the plating layer is increased (see a right graph).

Figure 17:
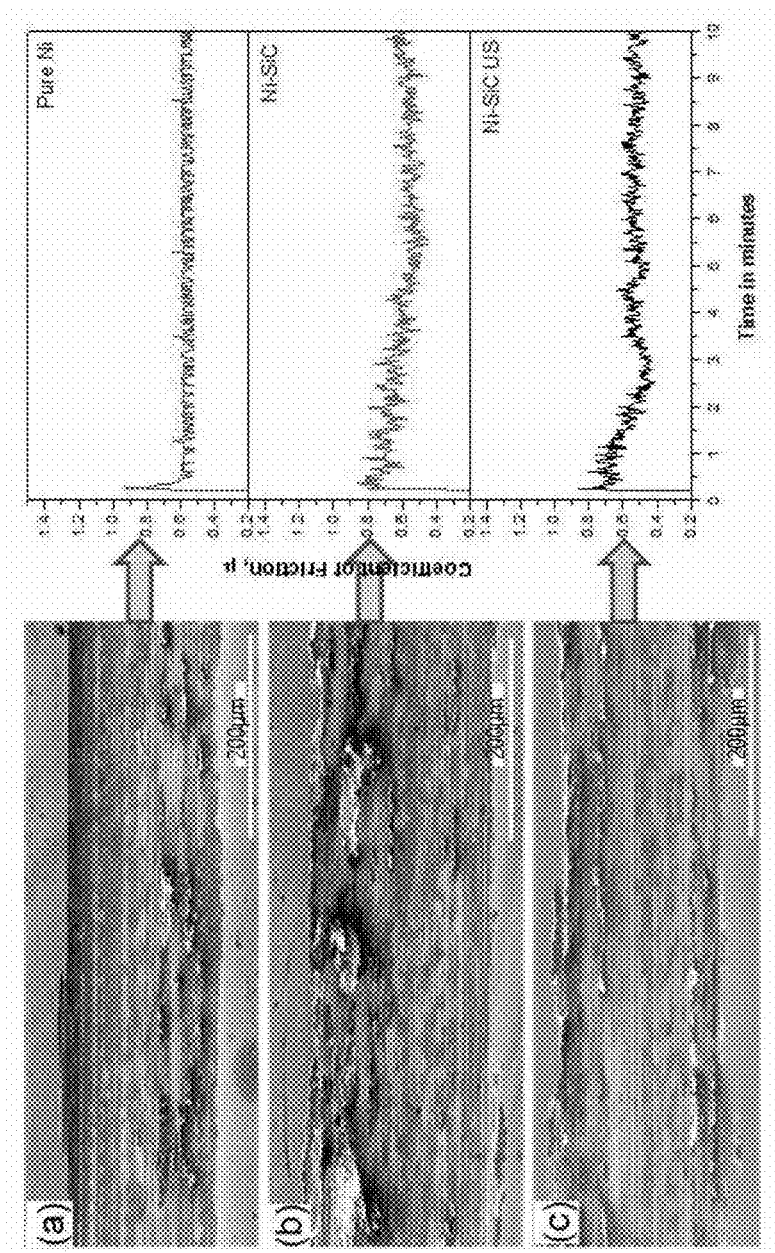
FIG. 17 is a photo and a graph of comparing and analyzing a wear and a friction coefficient depending on a current type and whether to apply the ultrasonic wave during electroplating.

FIG. 17 is a photograph and a graph of comparing and analyzing friction coefficients at the time of measuring a wear degree by targeting a pure Ni member, an Ni—SiC plating layer electroplated by using only a pulse current while the ultrasonic waves are not applied and a Ni—SiC plating layer electroplated by using the pulse current while the ultrasonic waves are applied together. Herein, when the Ni—SiC plating layers are compared with each other, it can be confirmed that when the Ni—SiC plating layer is generated while the ultrasonic waves are applied during electroplating, the friction coefficient is low and there is an effect of suppressing the crystal particles from being roughly generated due to uniform dispersion of SiC nano particles into the Ni matrix.

Figure 18:
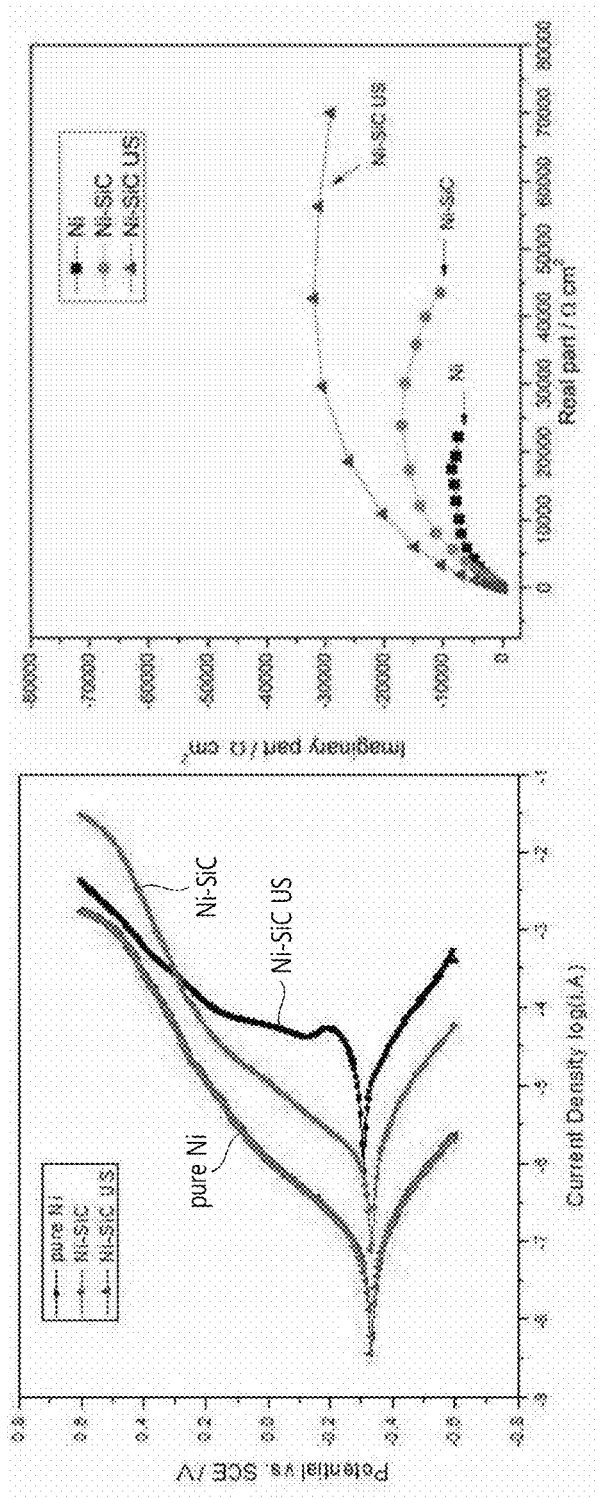
FIG. 18 is a graph of measuring and analyzing electrochemical corrosion depending on a current type and whether to apply the ultrasonic wave during electroplating.

FIG. 18 is a graph of measuring and analyzing electrochemical corrosion by targeting a pure Ni member, an Ni—SiC plating layer electroplated by using only a pulse current while the ultrasonic waves are not applied and a Ni—SiC plating layer electroplated by using the pulse current while the ultrasonic waves are applied together. However, the present experiment is performed in a NaCl solution of 3.5 wt %. Even through the analysis, the Ni—SiC plating layer electroplated by using the pulse current while the ultrasonic waves are applied together had a relatively low corrosion current density. Further, even with regard to an electric capacitance loop, the level of the Ni—SiC plating layer while applying the ultrasonic waves is larger, and the result means that like the resistance to corrosion, reaction resistance thereof is higher than other comparison objects.

Therefore, it can be confirmed that through the comparative analysis in various aspects described above, the Ni—SiC plating layer electroplated by using the pulse current while the ultrasonic waves are applied has an excellent low-friction characteristic.

Low-Friction Effect of Configuration of Combination of Plating Layer and Dimple

Subsequently, a result of comparing low-friction characteristics by forming various types of dimples in the Ni—SiC plating layer having the excellent low-friction characteristic confirmed above will be described below based on the accompanying drawings.

However, a laser apparatus for patterning dimples by using a laser used INYA20 and SL-1064-175-254 and the used parameters are illustrated in Table 2 below.

TABLE 2

| Power | Pulse width | Marking speed | Frequency | Wavelength |
|---|---|---|---|---|
| 10 watt | 200 ns | 300 mm/s | 20 kHz | 1064 nm |

As illustrated in Table 2 above, the wavelength of the laser was adjusted to 1064 nm, the output was adjusted to 10 W, the pulse width was adjusted to 200 ns, and the frequency was used to 20 kHz.

Figure 19:
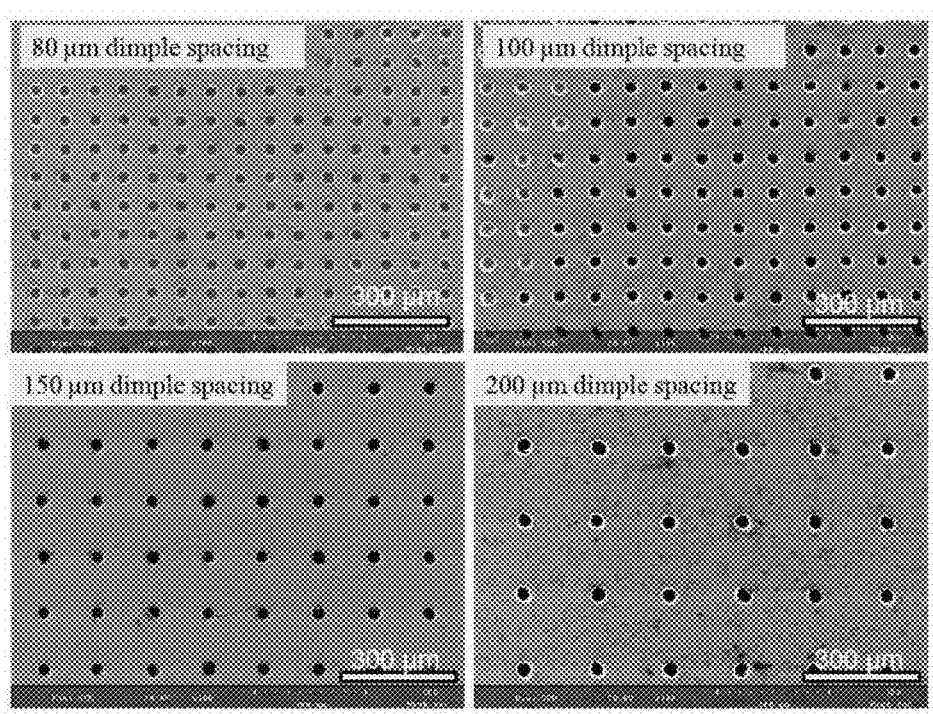
FIG. 19 is a photo of surfaces of comparison targets having different intervals of dimples adjacent to the Ni—SiC plating layer formed by electroplating.

FIG. 19 illustrates surface photographs when a plurality of dimples are formed on the Ni—SiC plating layer formed by electroplating and distances between adjacent dimples are 80, 100, 150, and 200 μm. The low-friction characteristics were compared with each other by friction-contacting comparison objects with a counter ball provided with a steel ball from various points of view. However, the experiment was performed when the sliding speed of the counter ball was 5 cm/s, the diameter of the counter ball was 12.7 mm, the total sliding distance was 180 m, the lubricant used was low-viscosity oil of 5 W30, and the applied force was 10 N.

Figure 20:
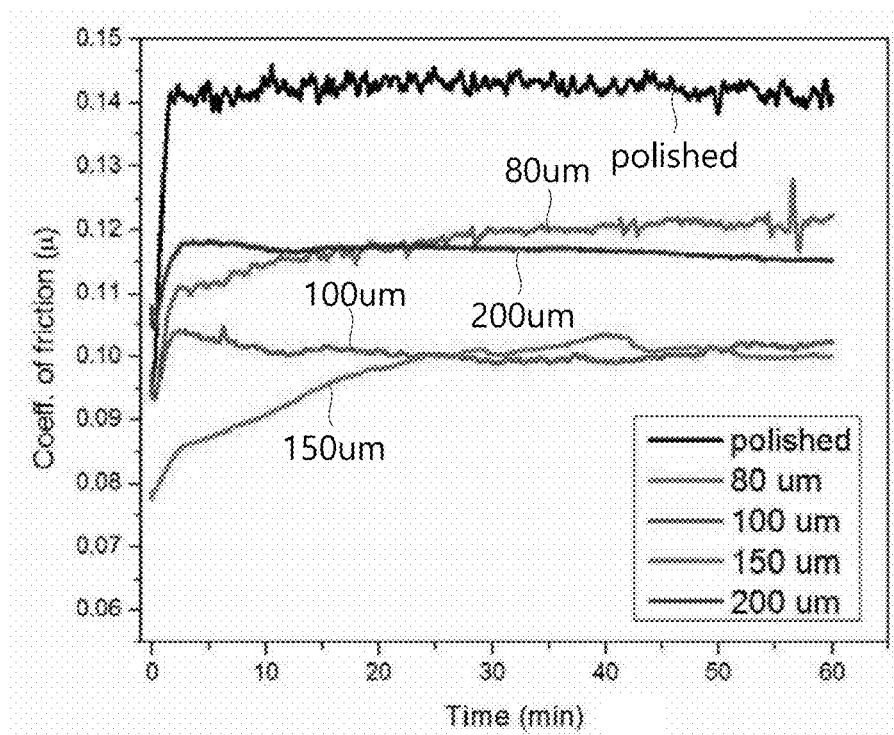
FIG. 20 is a graph of measuring friction coefficients of the comparison targets having different intervals of dimples adjacent to the Ni—SiC plating layer formed by electroplating.

As a result of measuring friction coefficients while slidingly contacting the counter ball with each comparison object, as illustrated in FIG. 20, when the distance between the adjacent dimples was 150 μm, the friction coefficient was lowest and when the dimple distance was 100 μm, next, the friction coefficient was decreased. On the other hand, it was confirmed that when the dimple was not formed, the relative friction coefficient was extremely high.

Figure 21:
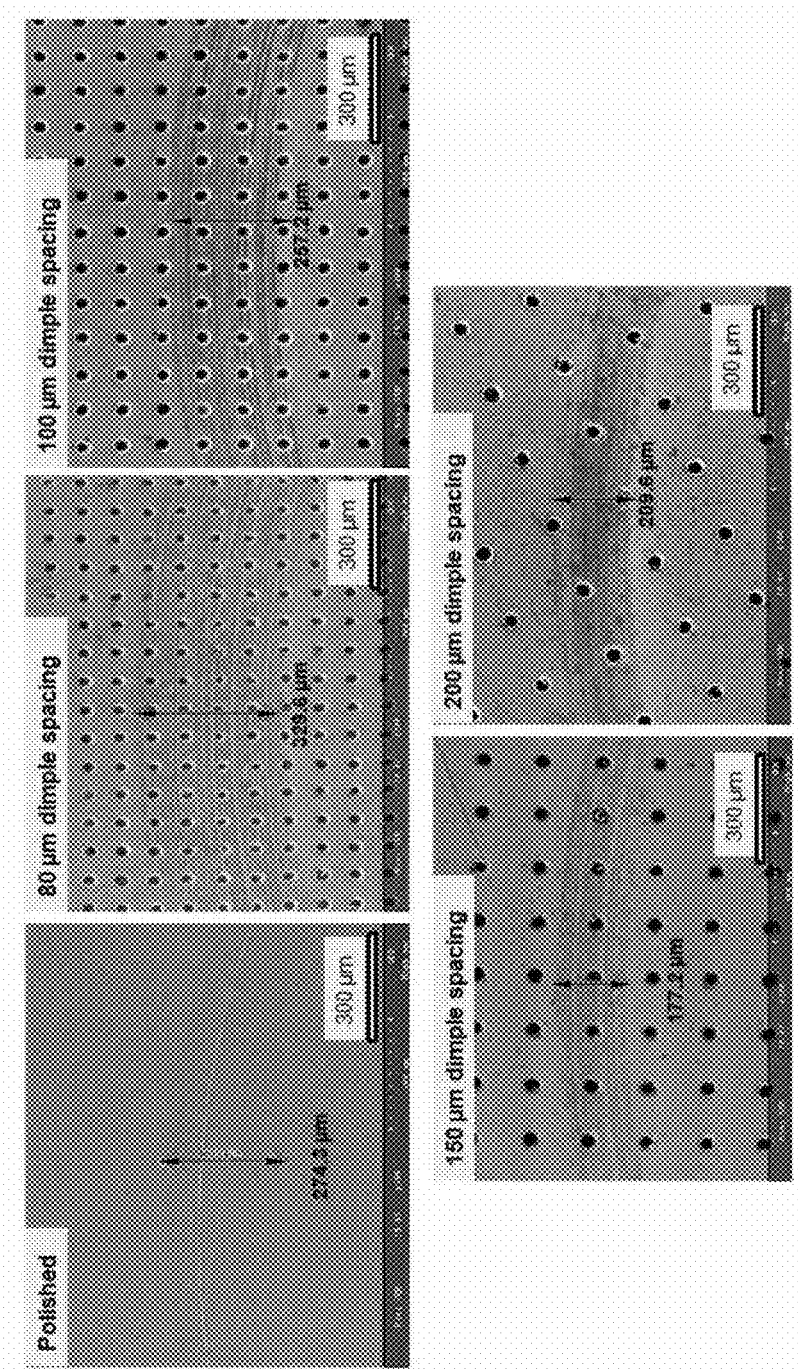
FIG. 21 is a graph of photographing wear tracks of the comparison targets having different intervals of dimples adjacent to the Ni—SiC plating layer formed by electroplating.
Figure 22:
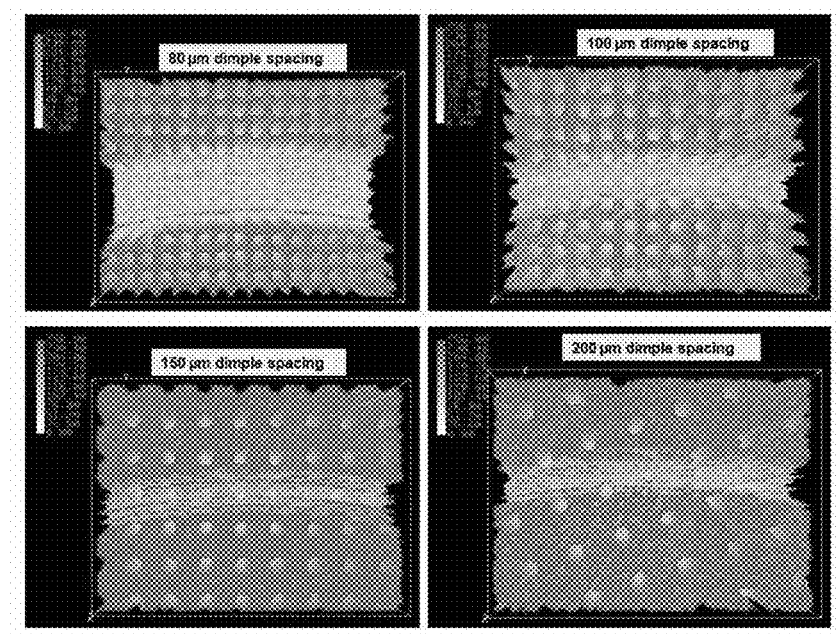
FIG. 22 is an optical microscope 3D photo of photographing the wear tracks of the comparison targets having different intervals of dimples adjacent to the Ni—SiC plating layer formed by electroplating.
Figure 23:
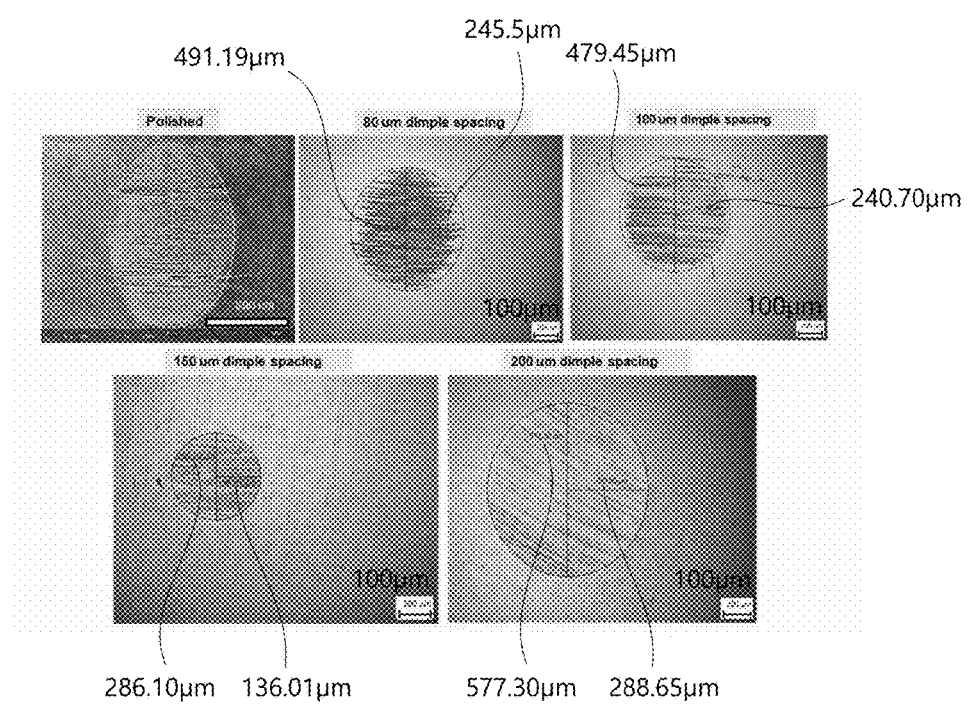
FIG. 23 is a graph of photographing a wear area of a counter ball which friction-contacts the comparison targets having different intervals of dimples adjacent to the Ni—SiC plating layer formed by electroplating.
Figure 24:
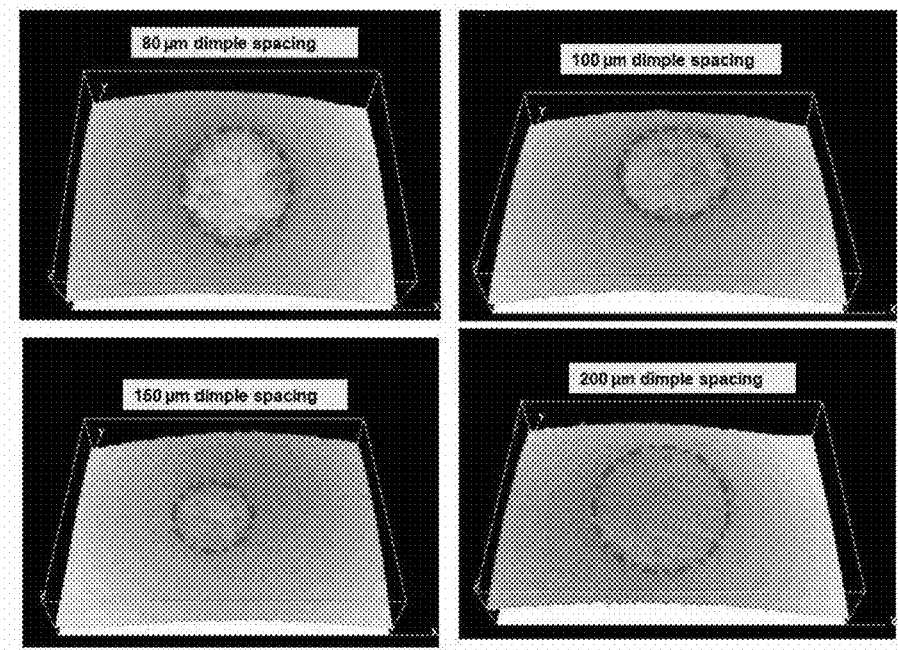
FIG. 24 is an optical microscope 3D photo of photographing the wear area of the counter ball which friction-contacts the comparison targets having different intervals of dimples adjacent to the Ni—SiC plating layer formed by electroplating.
Figure 25:
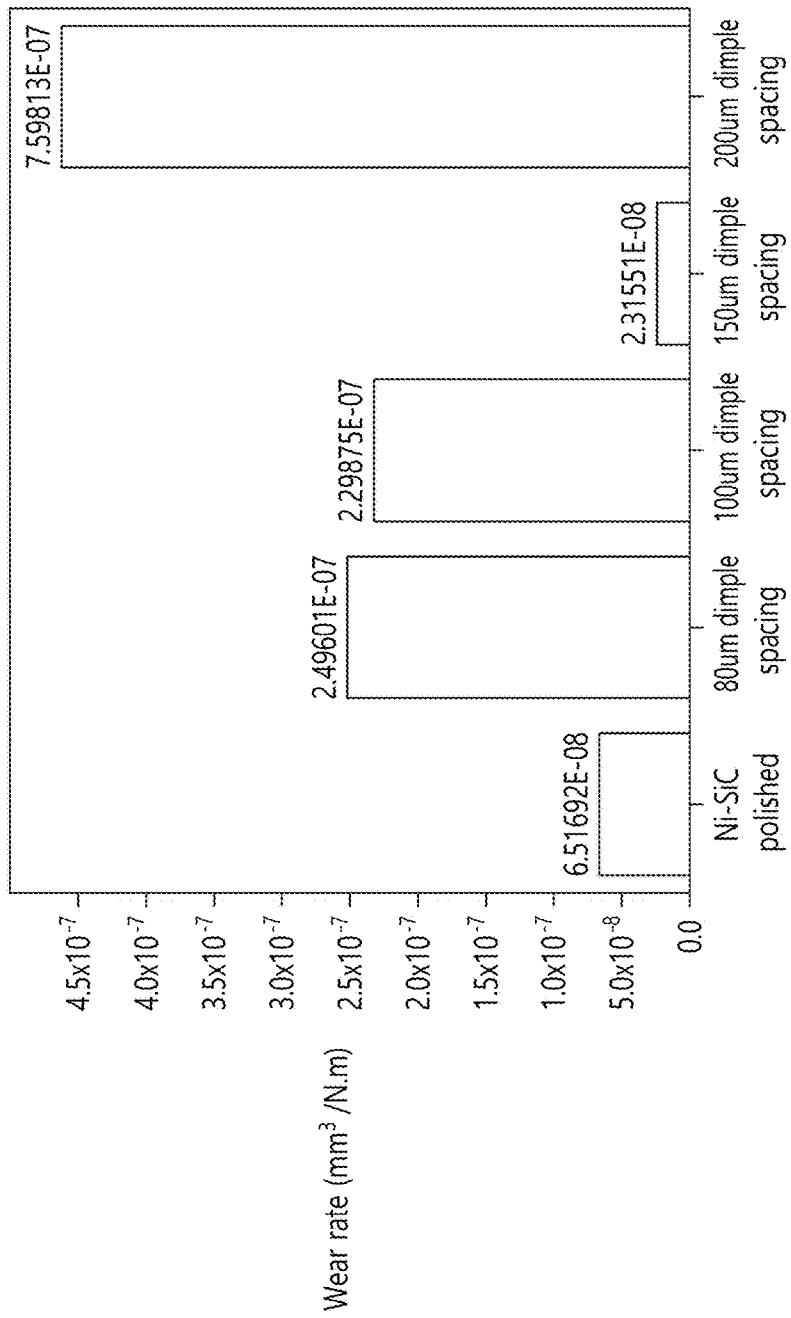
FIG. 25 is a graph of comparing the wear degrees of the comparison targets having different intervals of dimples adjacent to the Ni—SiC plating layer formed by electroplating.

FIG. 21 illustrates comparing low-friction characteristics through a shape of a wear track formed in each comparison object. As shown by the arrows, when a width of the wear track is measured, it can be confirmed that the width of the wear track is narrowest when the distance between the adjacent dimples is 150 μm and the width of the wear track is narrower in order of the dimple distances of 200 μm and 300 μm. Such a difference can be more clearly compared with a 3D image through an optical microscope in FIG. 22. Meanwhile, in FIG. 23, the wear degree of the surface of the counter ball slidingly contacted with the comparison object may be confirmed, and it can be confirmed that the wear region of the counter ball contacted with the comparison object formed with the distance between the adjacent dimples of 150 μm is the smallest. Such a difference may be visually determined more clearly through the 3D image through the optical microscope of FIG. 4 and such a result may also be verified from FIG. 25 in which the wear area of the counter ball is compared with a numerical value of mm per 3 Nm.

Figure 26:
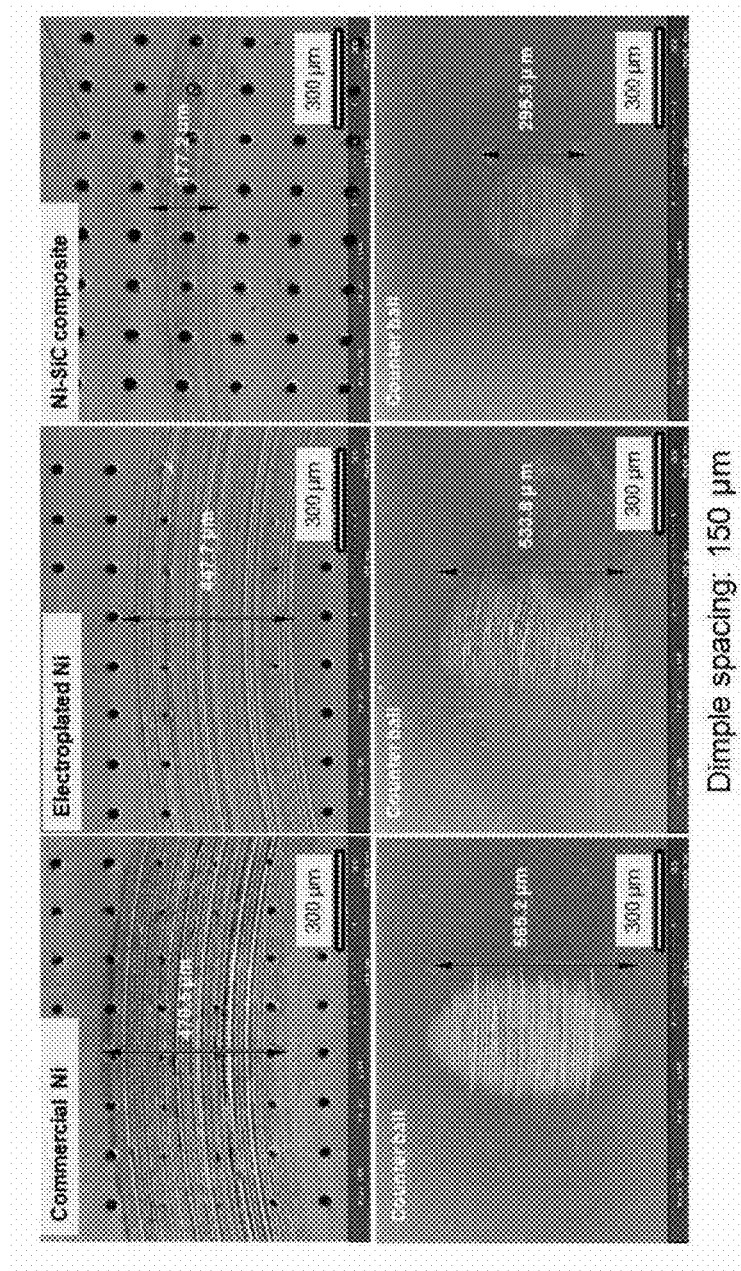
FIG. 26 is a photo illustrating the wear degrees of the surfaces of the base plate made of a material of Ni, the Ni plating layer electroplated on the surface of the base plate, and the Ni—SiC plating layer electroplated on the surface of the base plate to be compared.

FIG. 26 illustrate wear degrees of the surfaces of the base plate made of a material of Ni, the Ni plating layer electroplated on the surface of the base plate, and the Ni—SiC plating layer electroplated on the surface of the base plate to be compared. However, in this experiment, the dimples were formed with respect to all comparison targets and the intervals of the adjacent dimples were formed as 150 μm. According to the comparison result, it can be seen that in the case where the plating layer is formed by the electroplating, a width of a wear track or the wear degree is smaller than that in the case where the dimple is formed in the base plate made of only the material of Ni and in particular, when the plating layer is formed, the width of the wear track or the wear degree in the case where the plating layer is made of Ni—SiC is smaller than that in the case where the plating layer is made of Ni, and as a result, the low-friction characteristic is excellent.

Figure 27:
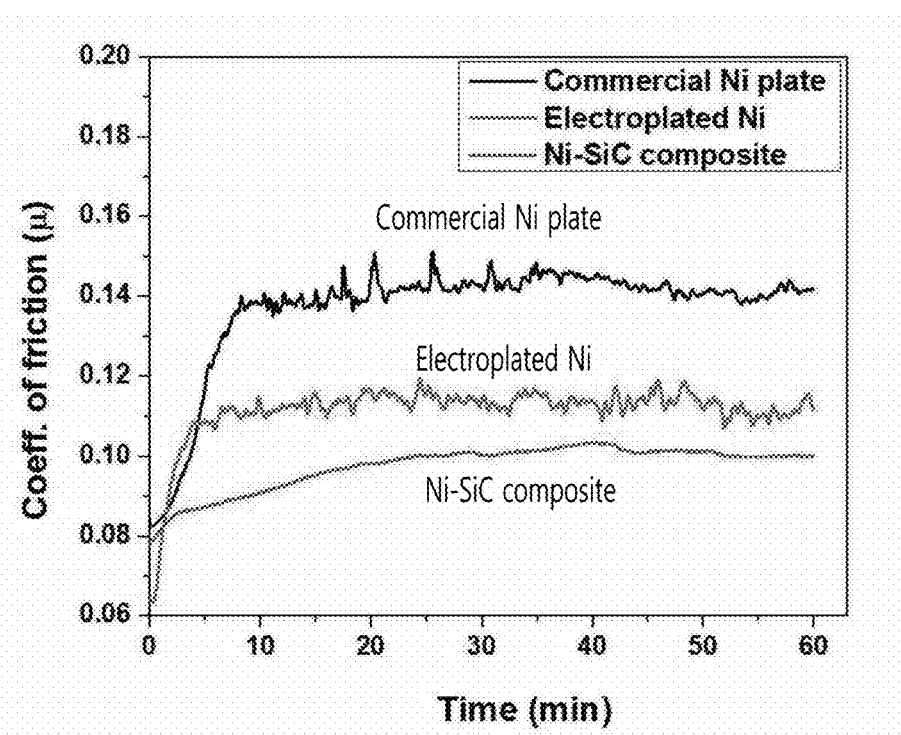
FIG. 27 is a graph of comparing surface friction coefficients of the base plate made of a material of Ni, the Ni plating layer electroplated on the surface of the base plate, and the Ni—SiC plating layer electroplated on the surface of the base plate to be compared.

FIG. 27 illustrate comparative measurement of surface coefficients of the base plate made of a material of Ni, the Ni plating layer electroplated on the surface of the base plate, and the Ni—SiC plating layer electroplated on the surface of the base plate. However, in such a comparative experiment, the intervals of adjacent dimples were made to be the same as each other as 150 μm, the sliding speed of the counter ball was set to 5 cm/s, the total sliding distance was set to 180 m, low-viscosity oil of 5W30 was used as the lubricant, and force of 10 N was similarly applied.

According to the comparative experimental result, as illustrated in FIG. 27, it is examined that the Ni—SiC plating layer acquired by the electroplating the base plate has the smallest friction coefficient. This is caused by high hardness and dispersion effect of the SiC nano particles when the Ni—SiC material is adopted.

When the comparative experimental results are integrated, the Ni—SiC plating layer having the excellent low-friction characteristic may be successfully formed by the pulse electroplating and when ultrasonic waves having a frequency and power at an appropriate level are applied during the electroplating, it can be seen that the low-friction characteristic is significantly improved. Furthermore, it can be seen that when the dimples adjacent to the Ni-material plating layer or the Ni—SiC-material plating layer having the low-friction characteristic are pattern at an interval of approximately 150 μm, the low-friction characteristic is more excellently improved.

Preferred embodiments of the present invention are described as above, but various changes, modifications, and equivalents may be used in the present invention. It is clear that the embodiments may be appropriately modified and similarly applied in the present invention. Accordingly, the disclosed contents do not limit the scope of the present invention defined by a limit of the claims.

The invention claimed is:

1. A low-friction member comprising:
   a substrate; and
   a lubricating layer constituted by plate-shaped particles which are stacked in layers on the surface of the substrate in the form of scales and multiple spherical metal lubricating particles having a smaller nano size than the plate-shaped particles and coated on the surfaces of the plate-shaped particles,
   wherein
   before the plate-shaped particles are stacked on the substrate, the spherical metal lubricating particles are coated on the surfaces of the plate-shaped particles to form composite particles and thereafter, stacked on the surface of the substrate in a form of the composite particles;
   the substrate is constituted by a base plate and a Ni—SiC-material plating layer formed on the surface of the base plate by electroplating in order to reduce friction which occurs due to surface contact;
   a low-friction dimple is formed on the plating layer with a depth not to exceed a thickness of the plating layer; and
   the spherical metal lubricating particles are disposed in a form of multiple bridges connecting the substrate and the plate-shaped particles and connecting the plate-shaped particles in the lubricating layer.

2. The low-friction member of claim 1, wherein the plate-shaped particles are graphene.

3. The low-friction member of claim 1, wherein the plate-shaped particles are made of any one material of polymer, ceramic, glass, and metallic fabric.

4. The low-friction member of claim 1, wherein the spherical lubricating particles are made of any one material of gold, silver, and copper.

5. A manufacturing method for a low-friction member, the method comprising:
   forming composite particles by coating spherical metal lubricating particles on surfaces of plate-shaped particles;
   stacking the composite particles in layer on the surface of a substrate in the form of scales; and
   strengthening bonding of the composite particles and the substrate with each other by pressing the composite particles and the substrate at a high temperature while the composite particles are stacked on the substrate,
   wherein
   in the forming of the composite particles, ultrasonic waves are applied to slurries including plate-shaped particles and spherical metal lubricating particles to coat the spherical metal lubricating particles on the surfaces of the plate-shaped particles by a collision of the plate-shaped particles and the spherical metal lubricating particles; and
   in order to manufacture the slurries including the plate-shaped particles and the metal lubricating particles, the plate-shaped particles are first introduced into a solvent and thereafter, stirred while applying ultrasonic waves to the plate-shaped particles to uniformly disperse the plate-shaped particles and thereafter, the spherical metal lubricating particles are additionally introduced into the solvent and thereafter, stirred while applying the ultrasonic waves to uniformly disperse the spherical metal lubricating particles.

6. The manufacturing method for a low-friction member of claim 5, wherein the stacking of the composite particles on the surface of the substrate includes
   providing electrophoresis slurries by mixing the composite particles with a dispersion medium,
   immersing the substrate to be coated in the electrophoresis slurries, and
   introducing an electrode into the electrophoresis slurries and coating the composite particles on the surface of the substrate while moving the composite particles by electrophoresis by applying an electric field.

* * * * *